(12) United States Patent
Kim

(10) Patent No.: US 9,514,367 B2
(45) Date of Patent: Dec. 6, 2016

(54) METHOD AND APPARATUS FOR PLAYING CONTENTS

(71) Applicant: Alticast Corporation, Seoul (KR)

(72) Inventor: Soo Woong Kim, Seoul (KR)

(73) Assignee: Alticast Corporation, Seoul (KR)

( * ) Notice: Subject to any disclaimer, the term of this patent is extended or adjusted under 35 U.S.C. 154(b) by 181 days.

(21) Appl. No.: 13/893,807

(22) Filed: May 14, 2013

(65) Prior Publication Data

US 2014/0245145 A1 Aug. 28, 2014

(30) Foreign Application Priority Data

Feb. 26, 2013 (KR) ........................ 10-2013-0020352

(51) Int. Cl.
*G06F 3/00* (2006.01)
*G06K 9/00* (2006.01)

(52) U.S. Cl.
CPC ................. *G06K 9/00744* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,751,683 B1* | 7/2010 | Belknap | .......................... | 386/278 |
| 8,503,985 B1* | 8/2013 | Belyaev | ...................... | 455/456.1 |
| 2004/0125124 A1* | 7/2004 | Kim et al. | .................... | 345/716 |
| 2004/0201609 A1* | 10/2004 | Obrador | ......................... | 345/723 |
| 2005/0047681 A1* | 3/2005 | Hori et al. | ..................... | 382/305 |
| 2005/0149557 A1* | 7/2005 | Moriya et al. | ............. | 707/104.1 |
| 2006/0078288 A1* | 4/2006 | Huang et al. | ..................... | 386/52 |
| 2006/0285818 A1* | 12/2006 | Murabayashi | .................. | 386/46 |
| 2007/0030391 A1* | 2/2007 | Kim et al. | ..................... | 348/564 |
| 2008/0019610 A1* | 1/2008 | Matsuzaka et al. | .......... | 382/284 |
| 2008/0022230 A1* | 1/2008 | Ogawa et al. | ................. | 715/838 |
| 2008/0159708 A1* | 7/2008 | Kazama et al. | ................ | 386/69 |
| 2008/0256450 A1* | 10/2008 | Takakura et al. | ............. | 715/721 |
| 2009/0051814 A1* | 2/2009 | Shirane et al. | ................ | 348/571 |
| 2009/0161962 A1* | 6/2009 | Gallagher et al. | ............ | 382/203 |
| 2009/0172543 A1* | 7/2009 | Cronin et al. | ................. | 715/721 |
| 2009/0207316 A1* | 8/2009 | Cupal et al. | ................... | 348/700 |
| 2009/0249208 A1* | 10/2009 | Song et al. | .................... | 715/721 |
| 2009/0268097 A1* | 10/2009 | Lin et al. | ...................... | 348/700 |
| 2009/0313324 A1* | 12/2009 | Brooks et al. | ................. | 709/203 |
| 2010/0050080 A1* | 2/2010 | Libert et al. | .................. | 715/716 |
| 2010/0070523 A1* | 3/2010 | Delgo et al. | ................... | 707/769 |
| 2010/0077289 A1* | 3/2010 | Das et al. | ...................... | 715/230 |
| 2010/0088646 A1* | 4/2010 | Nishimori et al. | ........... | 715/838 |
| 2010/0119210 A1* | 5/2010 | Kusunoki | ........................ | 386/95 |
| 2010/0262911 A1* | 10/2010 | Kaplan et al. | ................. | 715/719 |
| 2010/0321406 A1* | 12/2010 | Iwase | .................. | G06F 3/04812 345/638 |
| 2011/0013882 A1* | 1/2011 | Kusunoki et al. | ............. | 386/241 |

(Continued)

*Primary Examiner* — Hien Duong
(74) *Attorney, Agent, or Firm* — Mintz Levin Cohn Ferris Glovsky and Popeo, P.C.; Kongsik Kim; Jonathon Western

(57) ABSTRACT

A method and apparatus for playing contents are disclosed. The method may include: receiving an encoded content, where the content contains position information for each scene; decoding the encoded content; extracting a scene in which position information is changed, from among the scenes of the decoded content; creating a thumbnail for the extracted scene; and outputting at least one of the thumbnail and the content.

10 Claims, 13 Drawing Sheets

(56) References Cited

U.S. PATENT DOCUMENTS

| | | | |
|---|---|---|---|
| 2011/0103768 A1* | 5/2011 | Fujita | 386/248 |
| 2011/0135286 A1* | 6/2011 | Moon et al. | 386/330 |
| 2012/0070129 A1* | 3/2012 | Lin et al. | 386/278 |
| 2012/0078899 A1* | 3/2012 | Fontana et al. | 707/736 |
| 2012/0079380 A1* | 3/2012 | Tsai et al. | 715/716 |
| 2012/0117473 A1* | 5/2012 | Han et al. | 715/723 |
| 2012/0166950 A1* | 6/2012 | Frumar et al. | 715/719 |
| 2012/0210227 A1* | 8/2012 | Lin | 715/723 |
| 2012/0242794 A1* | 9/2012 | Park et al. | 348/46 |
| 2013/0101271 A1* | 4/2013 | Urushihara | 386/248 |
| 2013/0183022 A1* | 7/2013 | Suzuki et al. | 386/241 |
| 2013/0198321 A1* | 8/2013 | Martin et al. | 709/217 |
| 2013/0222640 A1* | 8/2013 | Baek et al. | 348/231.99 |
| 2014/0003501 A1* | 1/2014 | Soroushian et al. | 375/240.12 |
| 2014/0003502 A1* | 1/2014 | Soroushian et al. | 375/240.12 |
| 2014/0003523 A1* | 1/2014 | Soroushian et al. | 375/240.16 |
| 2014/0003799 A1* | 1/2014 | Soroushian et al. | 386/353 |
| 2014/0133548 A1* | 5/2014 | Mate et al. | 375/240.02 |
| 2014/0143799 A1* | 5/2014 | Nagorniak et al. | 725/32 |
| 2014/0247392 A1* | 9/2014 | Mooneyham | 348/554 |
| 2014/0301715 A1* | 10/2014 | Prat et al. | 386/241 |

* cited by examiner

METHOD AND APPARATUS FOR PLAYING CONTENTS

CROSS-REFERENCE TO RELATED APPLICATIONS

This application claims the benefit of Korean Patent Application No. 10-2013-0020352, filed with the Korean Intellectual Property Office on Feb. 26, 2013, the disclosure of which is incorporated herein by reference in its entirety.

BACKGROUND

1. Technical Field

The present invention relates to a methods and apparatus for playing a content with thumbnail images created using the position information for each scene in the content.

2. Description of the Related Art

When a video content is played, thumbnails may be provided to allow fast movement to certain significant scenes. Thumbnails can be used to show significant scenes in a content including video images, and the thumbnails may generally be created for scenes in which there are changes in position or circumstances.

In the related art, the I-frames of a video content may be extracted, after which thumbnails may be created for significant scenes if an extracted I-frame is largely different from the previous I-frame. With this approach, it may be difficult to automatically create thumbnails, as a pre-processing of the video content is required. Also, as the video content may undergo a pre-processing procedure for creating thumbnails before being provided to a client device, it may be difficult to provide the content in real time. If the content is to be provided in real time, the feature of providing thumbnails may have to be omitted.

SUMMARY

An aspect of the invention is to provide a method and apparatus for playing a content that can create thumbnail images by using the position information for each scene in the content.

When creating the thumbnails for a content including video data according to an embodiment of the invention, there is no separate pre-processing procedure required at the server end providing the content, so that it is possible to provide the content in real time.

One aspect of the invention provides an apparatus for playing a content with thumbnail images created using the position information for each scene in the content.

An embodiment of the invention can provide a client device that includes: a receiver unit configured to receive an encoded content; a decoder unit configured to decode the encoded content, where the decoded content contains position information for each scene; an extractor unit configured to extract a scene in which position information is changed, from among the scenes of the decoded content; a thumbnail creator unit configured to create a thumbnail for the extracted scene; and an output unit configured to output at least one of the thumbnail and the content.

Another embodiment of the invention can provide an apparatus for creating a content that includes: an input unit configured to capture each scene; a position acquiring unit configured to acquire a current position of the apparatus; and a content creator unit configured to create a content incorporating the captured scene and the current position.

Another aspect of the invention provides a method for playing a content with thumbnail images created using the position information for each scene in the content.

An embodiment of the invention can provide a method of playing a content that includes: receiving an encoded content, where the content contains position information for each scene; decoding the encoded content; extracting a scene in which position information is changed, from among the scenes of the decoded content; creating a thumbnail for the extracted scene; and outputting at least one of the thumbnail and the content.

With the method and apparatus for playing a content according to an embodiment of the invention, the content can be played with thumbnails created using the position information for each scene. As this does not require a separate pre-processing procedure at the server end providing the content, system resources can be utilized with greater efficiency, and thumbnails can be provided even when a video content is provided in real time.

Additional aspects and advantages of the present invention will be set forth in part in the description which follows, and in part will be obvious from the description, or may be learned by practice of the invention.

DETAILED DESCRIPTION

Figure 1:
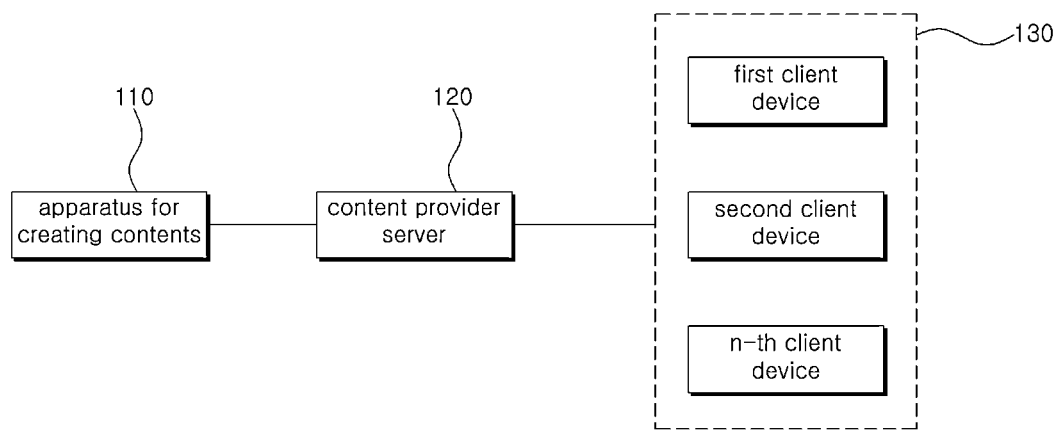
FIG. 1 schematically illustrates a system for providing contents according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present invention relates to contents including video images, where a content is created to include position information for each scene of the video (hereinafter referred to simply as a "scene"), so that a client device playing the content is able to easily extract certain scenes and create thumbnails by using the position information for each scene when playing the content. Certain embodiments of the invention will be described below in more detail with reference to the accompanying drawings. Even when it is not explicitly stated, the content may be understood to be containing video data.

Figure 2:
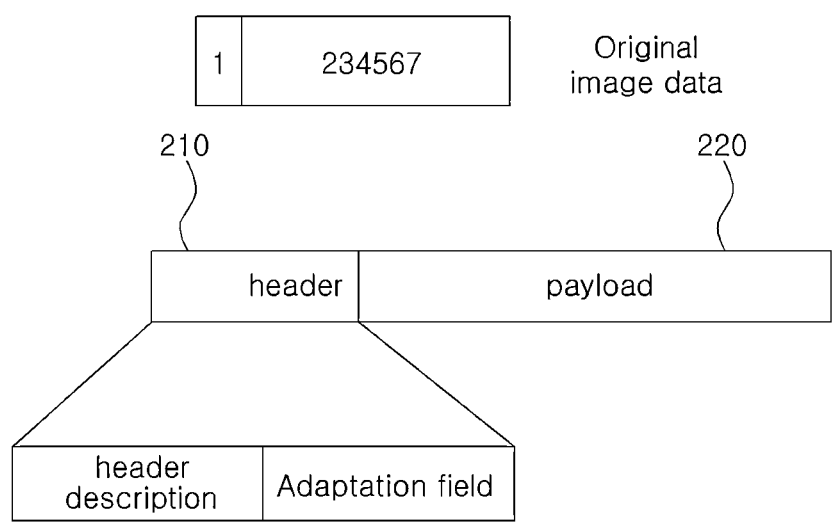
FIG. 2 illustrates the structure of a content according to an embodiment of the invention.
Figure 3:
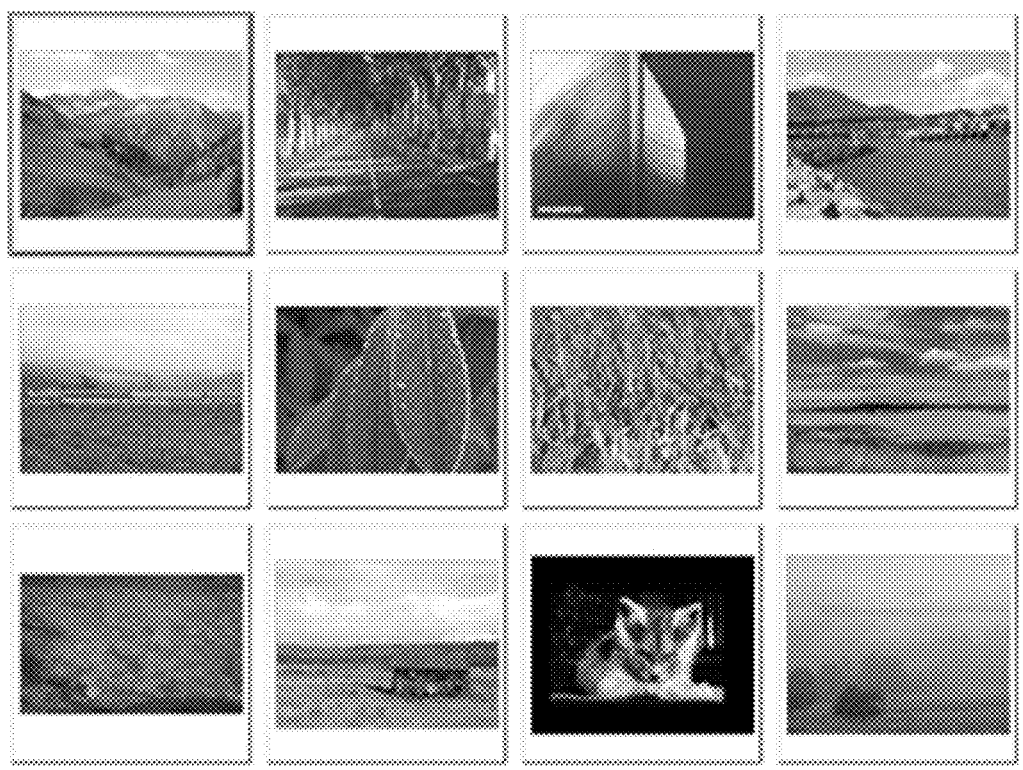
FIG. 3 and FIG. 4 illustrate a screen showing thumbnails according to an embodiment of the invention.
Figure 4:
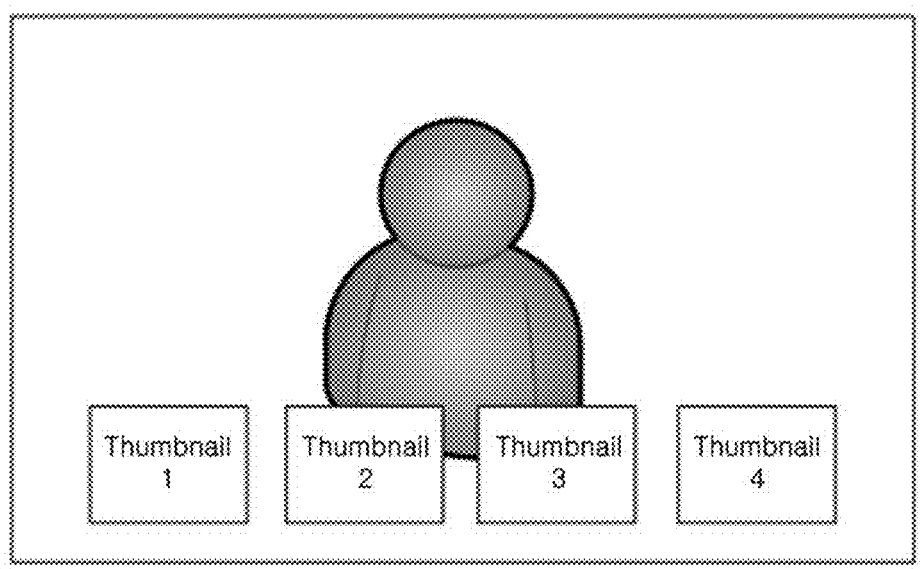

FIG. 1 schematically illustrates a system for providing contents according to an embodiment of the invention, FIG. 2 illustrates the structure of a content according to an embodiment of the invention, and FIG. 3 and FIG. 4 illustrate a screen showing thumbnails according to an embodiment of the invention.

Referring to FIG. 1, a system for providing contents according to an embodiment of the invention may include an apparatus 110 for creating contents, a content provider server 120, and a multiple number of client devices 130.

The apparatus 110 for creating contents may create a content. When the apparatus 110 creates a content, the content can contain position information for each scene.

For example, suppose that the content is a broadcast content. The apparatus 110 for creating contents can be a recording apparatus, such as a broadcasting camera, a camcorder, etc., for recording a broadcast screen.

To obtain the position information for each scene, the apparatus 110 for creating contents can include a position acquisition unit such as a GPS module as a component or can be connected by a separate interface to a position acquisition unit such as a GPS module.

Of course, according to the method of implementation, the apparatus 110 for creating contents can also receive the position information for each scene as input from a user.

The apparatus 110 for creating contents can store a content in the form of a raw data file that is not encoded by a particular encoding scheme, or for greater efficiency in data storage, etc., the content can be created and then encoded according to a designated scheme. For example, the apparatus 110 for creating contents can encode contents by a designated encoding scheme such as MPEG-4 or H.264, etc. In such cases, when a content is encoded by a designated scheme, the apparatus 110 for creating contents can store the content with the position information included in the header of each packet.

Thus, a content created by the apparatus 110 may be processed (by encoding, for instance) and edited such that it is suitable for transmission by the content provider server 120 and may be transmitted to each client device 130.

For example, if the content is a broadcast content, the content provider server 120 can edit and process the content created by the apparatus 110 into units of scenes (or frames), apply encoding by using a suitable encoding scheme (e.g. MPEG-2), and transmit it to each client device 130.

FIG. 2 illustrates the data structure of a content. As illustrated in FIG. 2, the apparatus 110 for creating contents can create a content with the position information for each scene incorporated in the header area. Then, in encoding the content inputted through the apparatus 110 and generating TS packets for transmission of the content, the content provider server 120 can include the position information in the header areas of the TS packets before transmitting them to each of the client devices.

As illustrated in FIG. 2, a packet may be composed of a header area 210, which stores a description of the packet, and a payload area 220, which stores the actual data. Also, the header area of a TS packet may be composed of a header description area, which describes the packet, and an adaptation field, which describes the data. The content provider server 120 can include position information in the header area of the TS packet, for example in the adaptation field as illustrated in FIG. 2, and transmit the packet to each client device 130.

As illustrated in FIG. 2, after the content is created with position information included for each scene, the created position information can be packetized by the content provider server 120 and can be transmitted to each client device 130.

The client device 130 may receive the encoded content through the content provider server 120, and may decode and play the content.

Also, the client device 130 can extract target scenes by using the position information for each scene in the decoded content, create thumbnail images for the target images, and separately store and manage the play position or play time for each thumbnail image. In the present disclosure, a target scene refers to a video image extracted based on the position information in the content. Also, a play position represents the frame corresponding to a thumbnail (i.e. the frame number) in the content, while a play time represents the time up to the frame for which a corresponding thumbnail is positioned in the content (i.e. the time from the initial frame of the content up to the frame corresponding to the thumbnail).

As described above, the content may be created with the position information for each scene included, before it is provided to each client device 130. Thus, the client device 130 can use the position information for each scene of the content to extract the target scenes and convert them into thumbnails.

The client device 130 can show the thumbnail images for target scenes, extracted using the position information of each scene, separately with no relation to the playing of the content (see FIG. 3), or show the thumbnails in a certain area of the content being played in the form of an OSD (on-screen display) (see FIG. 4).

Also, when a play request is inputted or received after one of the thumbnails is selected, the client device 130 can play the content from the play position or play time corresponding to the thumbnail image.

The types of client devices 130 can include, for example, a mobile communication terminal, a computer, a laptop, a tablet PC, a set-top box, a TV, etc.

Figure 5:
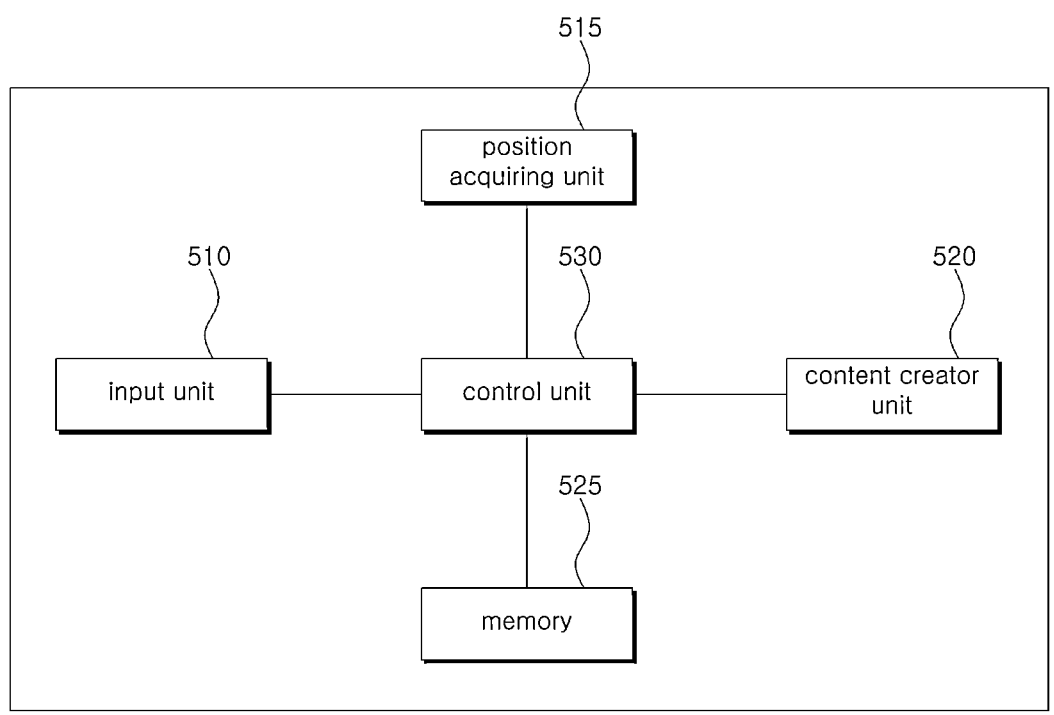
FIG. 5 is a block diagram illustrating the internal composition of an apparatus for creating a content according to an embodiment of the invention.

FIG. 5 is a block diagram illustrating the internal composition of an apparatus for creating a content according to an embodiment of the invention.

Referring to FIG. 5, an apparatus 110 for creating contents may include an input unit 510, a position acquiring unit 515, a content creator unit 520, a memory 525, and a control unit 530.

The input unit 510 may input (or capture) signals associated with each scene forming the content (hereinafter referred to as scene signals) from the outside.

For example, suppose the content is a broadcast content. The input unit 510 can capture each scene and output the captured scene signals to the control unit 530.

The position acquiring unit 515 may acquire the current position of the apparatus 110 for creating contents. For example, position acquiring unit 515 can be a GPS module. The method of acquiring a position by way of a GPS module is obvious to those skilled in the art and as such will not be elaborated here. The position information can include, for instance, latitude, longitude, or coordinate information with which to specify a position.

Although FIG. 5 assumes an example in which the position acquiring unit 515 is included as a component of the apparatus 110 for creating contents, different implementations can have a device equipped with a position acquiring function connected with the apparatus 110 for creating contents.

The content creator unit 520 may synthesize each of the scene signals to create a content. Here, the content creator unit 520 can create the content incorporating not only each of the scene signals but also the position information inputted through the position acquiring unit 515. Here, the content creator unit 520 can create a content with the position information included in the header area for each scene.

For example, in cases where the content is a broadcast content, the content creator unit 520 can create the content including the position information of each scene for the broadcast screen.

The memory 525 may store various applications, scene signals, position information, contents, etc., necessary for operating the apparatus 110 for creating contents.

The control unit 530 may control the internal components (e.g. the input unit 510, position acquiring unit 515, content creator unit 520, memory 525, control unit 530, etc.) of the apparatus 110 for creating contents according to an embodiment of the invention.

Figure 6:
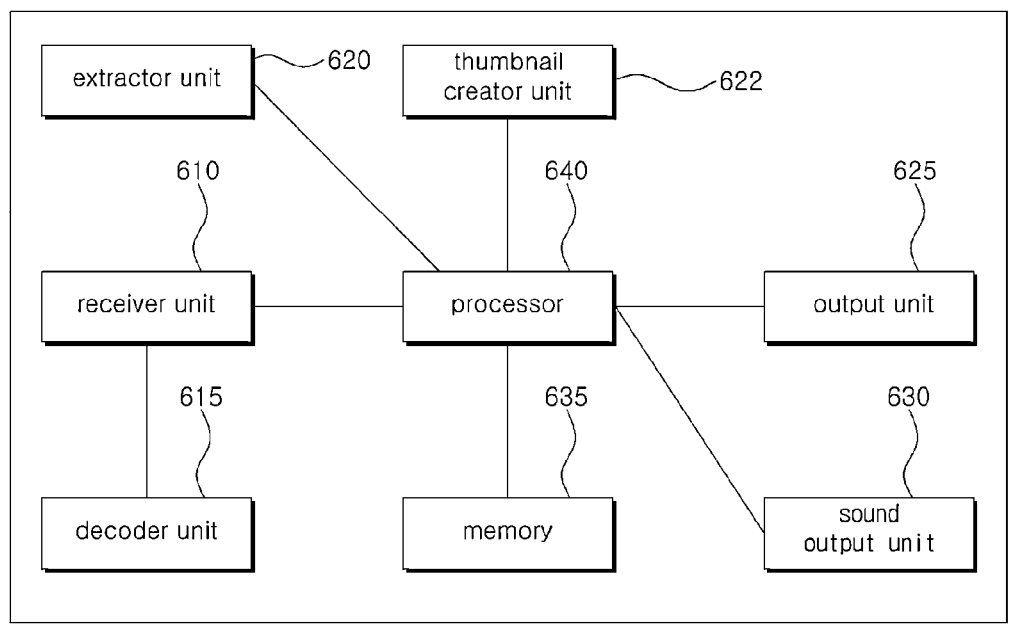
FIG. 6 is a block diagram schematically illustrating the internal composition of a client device according to an embodiment of the invention.

FIG. 6 is a block diagram schematically illustrating the internal composition of a client device according to an embodiment of the invention.

Referring to FIG. 6, a client device 130 according to an embodiment of the invention may include a receiver unit 610, a decoder unit 615, an extractor unit 620, a thumbnail creator unit 622, an output unit 625, a sound output unit 630, a memory 635, and a processor 640.

The receiver unit 610 may receive an encoded content. For example, the receiver unit 610 can receive an encoded content from the content provider server 120 and output it to the decoder unit 615.

The decoder unit 615 may decode the encoded content received through the receiver unit 610. For example, the decoder unit 615 can decode the encoded content using an MPEG-2 or an H.264 codec.

In the present disclosure, it is assumed that the content is encoded by the content provider server 120 by MPEG-2 or H.264 and that the decoder unit 615 decodes the encoded content by using an MPEG-2 or an H.264 codec. However, if the content is encoded by the content provider server 120 using a different encoding scheme, the decoder unit 615 may obviously decode the content using a decoding scheme corresponding to the encoding scheme.

The extractor unit 620 may extract the scenes for which thumbnails are to be created, from the content decoded by the decoder unit 615, according to the control of the processor 640.

For example, from each of the scenes of the decoded content, the extractor unit 620 can extract scenes where the positions are changed, as target scenes for creating thumbnails. To be more specific, if there are multiple frames for which the position information is repeated, from among the scenes of the decoded content, the extractor unit 620 can extract the earliest of the multiple frames having repeated position information (or rather, the earliest I-frame) as a target scene. Here, the extractor unit 620 can store the play position and play time for the extracted target scene in linkage with the target scene.

For example, consider a decoded content in which the first scene, second scene, and third scene are associated with first position information while the fourth scene and fifth scene are associated with second position information. Here, the extractor unit 620 can extract the first scene as a target scene and skip over the second and third scenes, as these have the same position information as that of the first scene. Next, since the position information of the fourth scene is different from that of the first scene, the extractor unit 620 can extract the fourth scene as a target scene. In this manner, the extractor unit 620 can extract scenes having different position information, from among the scenes forming the content, as target scenes.

Also, from among the scenes of the decoded content, even when a scene is associated with position information that is changed, the extractor unit 620 may not extract the scene if the difference between the position information of the scene and the position information of a previously extracted scene is below a reference value. Using as an example a scene in which an actor and an actress are having a conversation, the positions for the actor and the actress can be different from each other in the conversation scene. However, the scenes showing the actor and the actress conversing should be recognized as essentially being one scene. In this case, in order to prevent the scenes showing the actor and the actress from being extracted as separate scenes, the extractor unit 620 can recognize the scenes as belonging to one group, if the difference in position information of two scenes is very small and falls below a reference value, and thus may not extract the scene. In another example, if the position information is changed continuously for the decoded scenes (e.g. scenes captured from a moving vehicle, etc.), the extractor unit 620 can be configured to extract a scene only when the difference in position information between scenes is greater than or equal to a particular value. That is, in the case of scenes captured from a moving vehicle, the position information may be changed gradually and continuously between scenes. Thus, the extractor unit 620 can recognize these scenes as belonging to one group, and can afterwards extract a scene for creating a thumbnail if the difference between position information is greater than or equal to a particular difference value for scenes in which the position is changed continuously.

The thumbnail creator unit 622 may create a thumbnail for a target image extracted by the extractor unit 620. The thumbnail creator unit 622 can also store the play position or play time for the scene corresponding to the thumbnail.

The method of creating a thumbnail itself is already well known to those skilled in the art, and as such, will not be elaborated here in further detail.

The output unit 625 may show the content and the thumbnails in the form of visual information, according to the control of the processor 640.

According to the control of the processor 640, the output unit 625 can show only the thumbnail images, or show the thumbnails overlaid on the content being played, in an area of the screen on which the played content is shown. In cases where the thumbnail images are shown overlaid in an area of the screen showing the content being played, the thumbnails can be shown arranged in intervals corresponding to the play times and play positions.

The sound output unit 630 may output sound signals for the content in analog form according to the control of the processor 640. For instance, the sound output unit 630 can be a speaker.

The memory 635 may store various applications necessary for operating the client device 130 according to an embodiment of the invention. Also, the memory 635 can store significant images extracted through the extractor unit 620 as well as thumbnails for the significant images. The memory 635 can also store contents decoded by the decoder unit 615.

The processor 640 may control each of the components (e.g. the receiver unit 610, decoder unit 615, extractor unit 620, output unit 625, sound output unit 630, memory 635, etc.) of the client device 130 according to an embodiment of the invention.

Also, the processor 640 can provide the control for playing the content through the output unit 625 and sound output unit 630. The processor 640 can provide the control such that the thumbnails for significant images are outputted by way of the output unit 625 irrespective of the playing of the content or such that the thumbnails for the significant images are outputted as an OSD in an area of the screen showing the content being played.

Also, when one of the thumbnails is selected by way of an input device, such as a remote control, and play is requested, the processor 640 can provide control such that the content is played from the play position or play time corresponding to the thumbnail.

Figure 7:
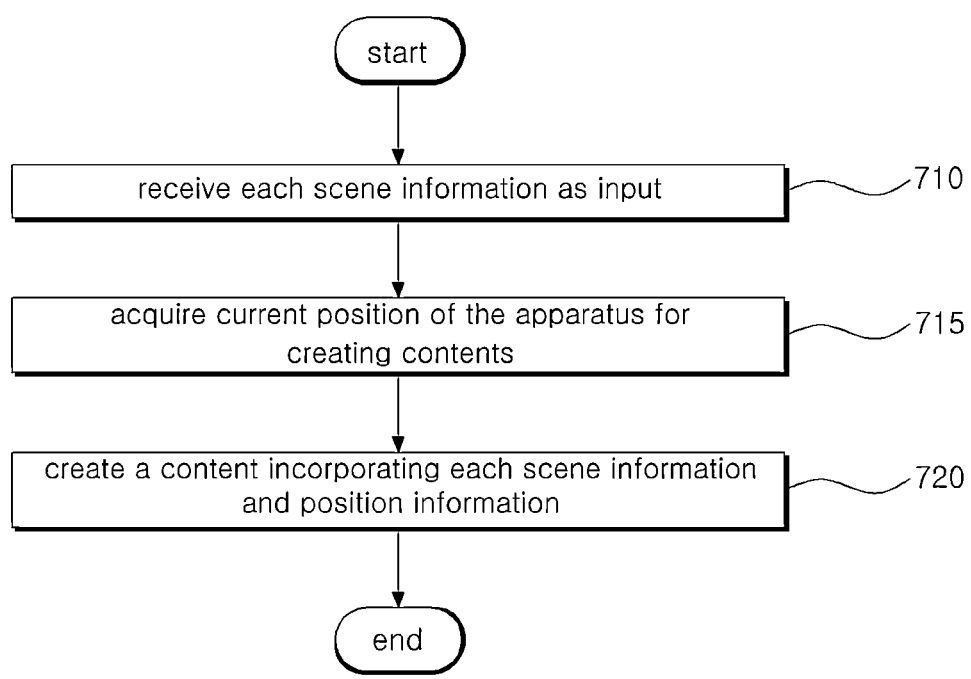
FIG. 7 is a flowchart illustrating a method of creating a content as performed by an apparatus for creating a content according to an embodiment of the invention.

FIG. 7 is a flowchart illustrating a method of creating a content as performed by an apparatus for creating a content according to an embodiment of the invention. In the descriptions that follow, each operation may be performed by a component of the apparatus for creating contents, but for easier explanation and better understanding, the operations will be described as being performed simply by the apparatus.

In operation 710, the apparatus 110 for creating contents may receive each scene information as input.

For example, in cases where the apparatus 110 creates a broadcast content, each scene may be captured and the scene information can be stored.

In operation 715, the apparatus 110 for creating contents may acquire the current position of the apparatus 110. For example, the apparatus 110 for creating contents can utilize a GPS module to acquire GPS information as the current position. Here, the GPS information can include coordinates for the latitude and longitude of the corresponding position.

Although FIG. 7 illustrates operation 710 and operation 715 as being performed sequentially, operation 710 and operation 715 can be performed in parallel, or the order of operation 710 and operation 715 can be reversed.

In operation 720, the apparatus 110 for creating contents may create a content incorporating each scene information and position information. Here, the content can be in the form of a raw data file. Of course, according to the method of implementation, the content can also be in an encoded form.

Figure 8:
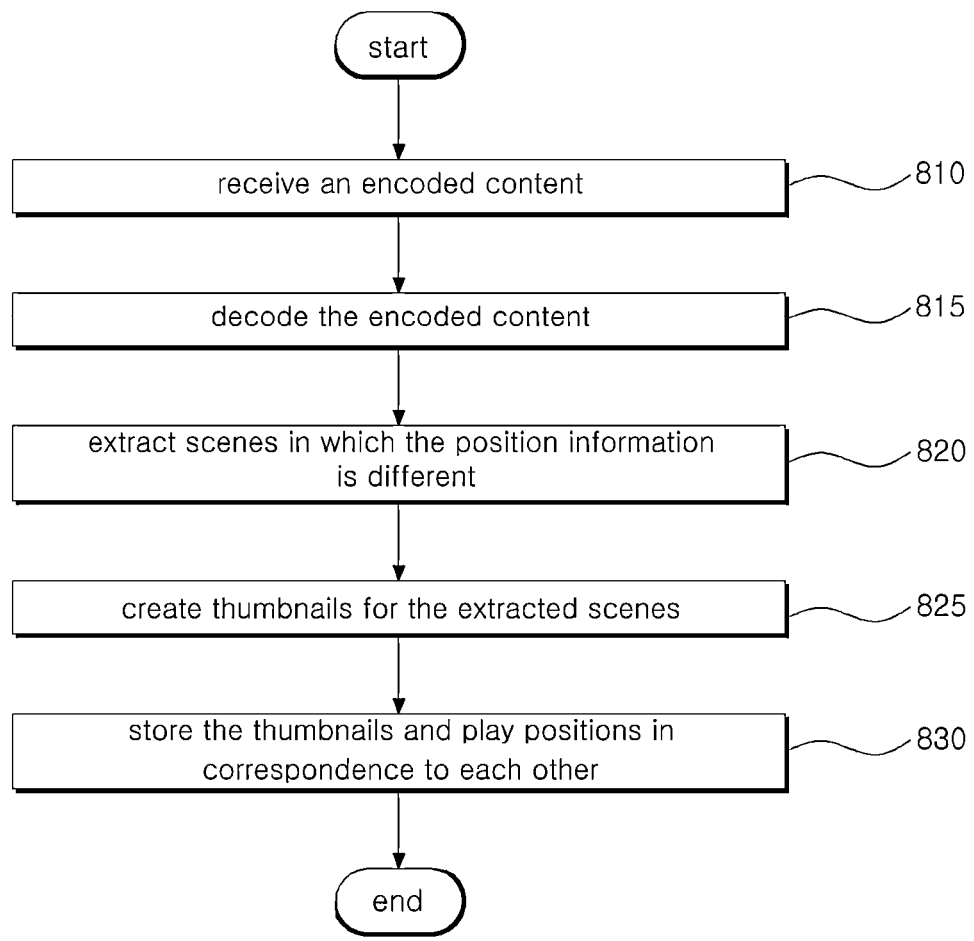
FIG. 8 is a flowchart illustrating a method of creating and managing thumbnails for a content as performed by a client device according to an embodiment of the invention.

FIG. 8 is a flowchart illustrating a method of creating and managing thumbnails for a content as performed by a client device according to an embodiment of the invention. In the descriptions that follow, each operation may be performed by a component of the client device, but for easier explanation and better understanding, the operations will be described as being performed simply by the client device.

In step 810, the client device 130 may receive an encoded content.

In step 815, the client device 130 may decode the encoded content according to a predetermined method.

In step 820, the client device 130 may extract scenes in which the position information is changed, from among the scenes of the decoded content, as target scenes.

As described above, the content may include the position information for each scene in the header area. Thus, the client device 130 can extract and check the position information for each scene from the header area, and extract those scenes (or frames) in which the position information is different from that of a previous scene as target scenes. For example, if there are multiple scenes (or frames) in the content in which the position information is repeated, the client device 130 can extract the earliest scene (or frame (I-frame)) from among the multiple scenes having repeated position information as a target scene.

In step 825, the client device 130 may convert the extracted target scene into a thumbnail. As the method itself of converting to a thumbnail is apparent to those skilled in the art and is not directly relevant to the essence of the present invention, further descriptions on this matter are omitted.

In step 830, the client device 130 may store play positions that correspond to the converted thumbnails. Here, a play position can be a position (or scene (frame)) at which the scene corresponding to a thumbnail for a content is to be played.

Of course, the client device 130 can also store play times corresponding to the thumbnails.

As the client device 130 thus stores the play positions or play times as well for scenes (frames) that are to be played in correspondence to the converted thumbnail images, when a thumbnail is selected, the content can be played from a stored play position or play time corresponding to the thumbnail. This will be described below in more detail with reference to FIG. 9.

The converted thumbnail images can be outputted through the client device 130 by themselves with no relation to the playing of the content, as illustrated in FIG. 3. Or course, the converted thumbnail images can also be shown in an area of the content being played in the form of an OSD (on-screen display), as illustrated in FIG. 4.

The method of moving to or playing a content at a particular play position of the content by selecting a thumbnail will be described below with reference to FIG. 9.

Figure 9:
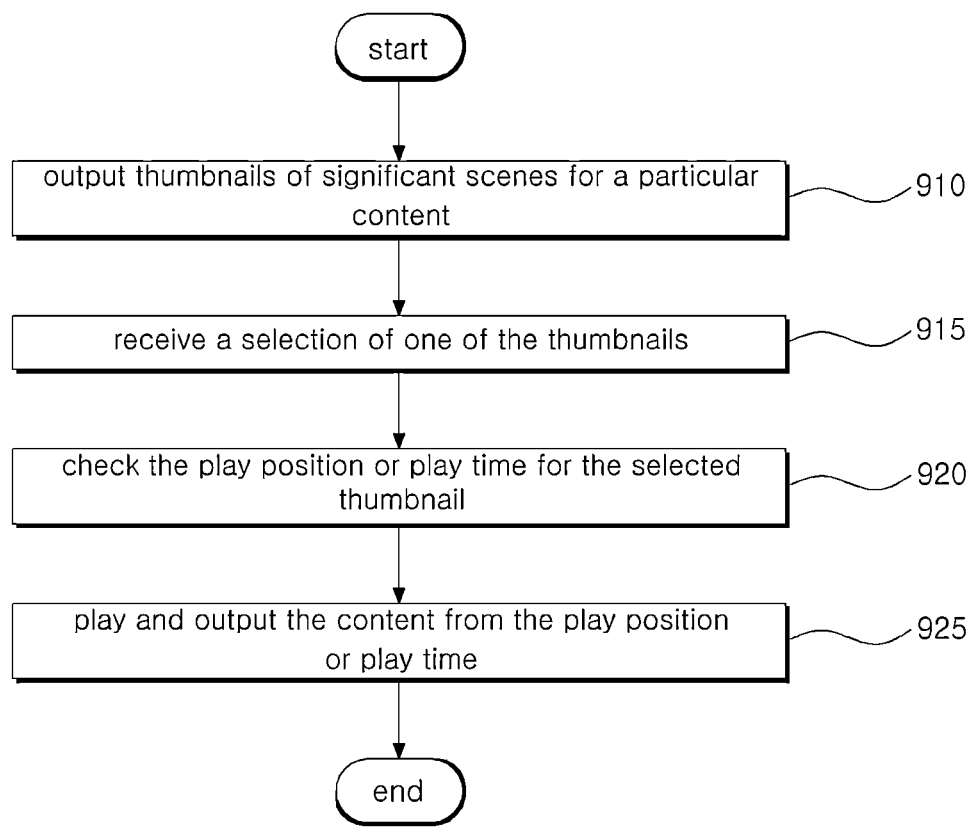
FIG. 9 is a flowchart illustrating a method of playing a content as performed by a client device according to an embodiment of the invention.
Figure 10:
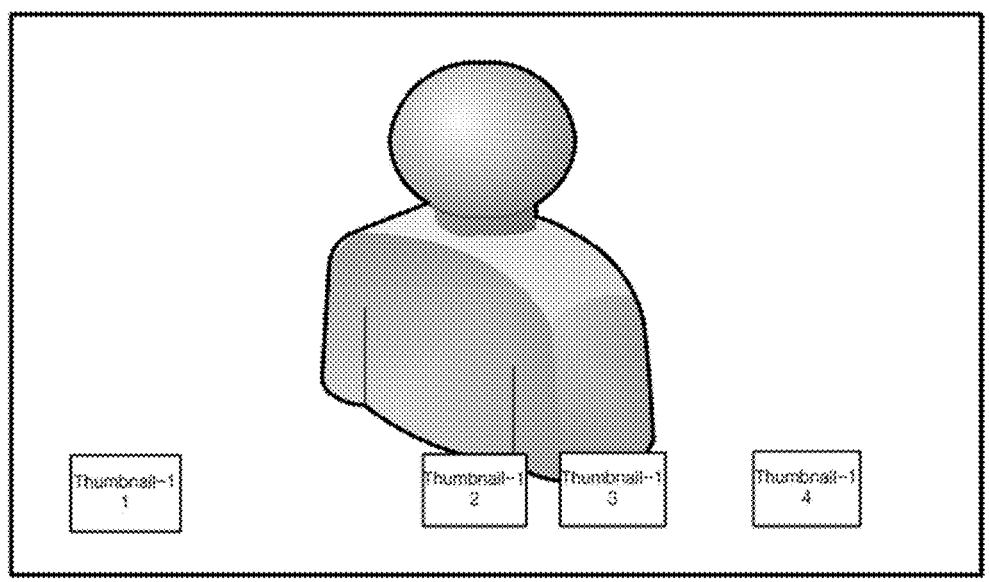
FIG. 10 illustrates a screen showing thumbnails according to another embodiment of the invention.

FIG. 9 is a flowchart illustrating a method of playing a content as performed by a client device according to an embodiment of the invention, and FIG. 10 illustrates a screen showing thumbnails according to another embodiment of the invention. The descriptions that follow will continue from the operations that may be performed after the operations of extracting storing target scenes for a content described above with reference to FIG. 8.

In step 910, the client device 130 may output the thumbnail images for a particular content.

Here, the thumbnails can represent scenes at which the positions are changed, and the thumbnails can be shown as in FIG. 3, with only the thumbnail images shown continuously, or as in FIG. 4, with the client device 130 showing the thumbnail images in the form of an OSD together with the content, before or during the playing of the content.

If thumbnails are to be shown in an area of the screen on which the content is played, the thumbnails can be separated in certain intervals and shown overlaid in an area of the content being played. In another example, the thumbnails can be separated and arranged in correspondence to their corresponding play positions or play times, overlaid in an area of the content. In this way, the user can get a rough idea of the play points simply from the thumbnail images shown in an area of the content being played (see FIG. 10).

In step 915, the client device 130 may receive a selection of one of the thumbnails shown, according to the user's control. The client device 130 can be inputted with a control command for selecting a thumbnail directly from the user, or can receive the input of a control command for selecting one of the thumbnails by way of a separate input device such as a remote control.

In step 920, the client device 130 may check the play position or play time corresponding to the selected thumbnail.

In step 925, the client device 130 may play and output the content beginning at the play position or play time identified above.

Although FIG. 9 assumes an example in which the content is played from the play position or play time corresponding to one selected thumbnail, different implementations can entail receiving a sequential selection of several thumbnails and playing the content while skipping to the play positions or play times corresponding to the selected thumbnails.

The foregoing descriptions focused on a method of creating thumbnails by using the position information of each scene in a content and then providing the thumbnails together with the content.

According to another embodiment of the invention, supplementary information (e.g. a recommended travel route) can be provided by using the thumbnails created by using the position information of each scene of a content and the position information associated with each thumbnail. This is described below in more detail.

Figure 11:
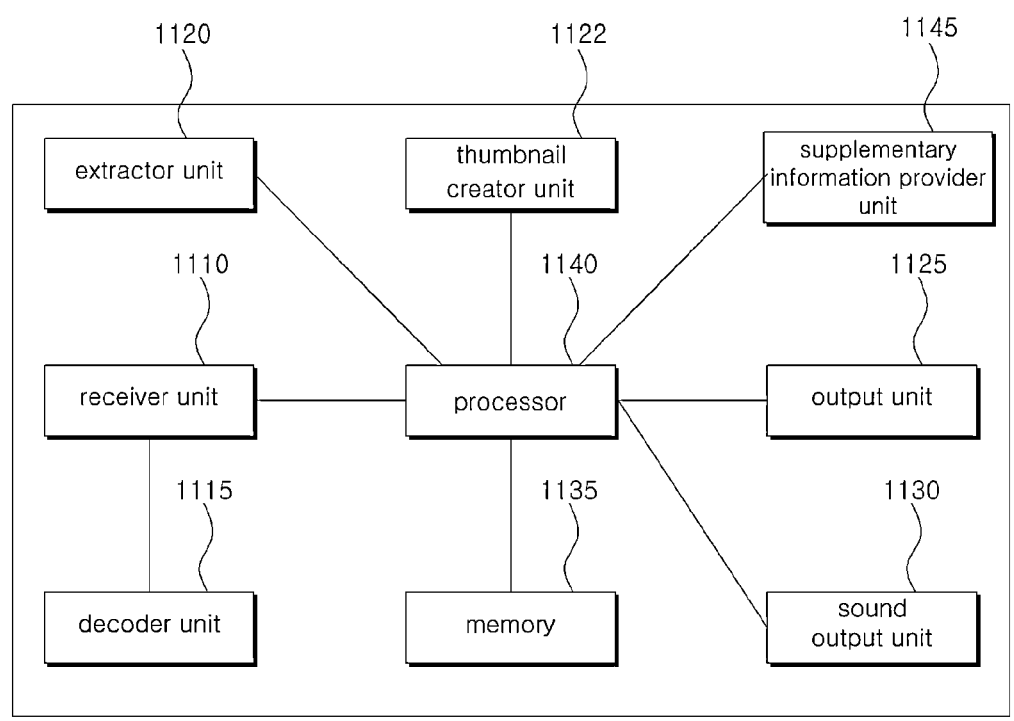
FIG. 11 is a block diagram schematically illustrating the internal composition of a client device that can provide supplementary information by using a content according to another embodiment of the invention.

FIG. 11 is a block diagram schematically illustrating the internal composition of a client device that can provide supplementary information by using a content according to another embodiment of the invention.

Referring to FIG. 11, a client device may include a receiver unit 1110, a decoder unit 1115, an extractor unit 1120, a thumbnail creator unit 1122, an output unit 1125, a sound output unit 1130, a memory 1135, a processor 1140, and a supplementary information provider unit 1145. In the descriptions that follow, the components and functions that are the same as those of the client device described with reference to FIG. 6 will not be described again, focusing mainly on the parts that are different.

In the descriptions that follow, it will be assumed that the client device has extracted scenes from the content in which the position information is changed and has created and stored these as thumbnails. Here, it is also assumed that the thumbnails are stored together with the position information for the scenes corresponding to the thumbnails.

Although the following descriptions are provided for an example in which the supplementary information related to a content is a travel route, it is obvious that the supplementary information can include various other types of information for specific locations (e.g. information on the history, local eatery, and local festival, etc., of a location).

The supplementary information provider unit 1145 may provide supplementary information by using the pre-stored position information and thumbnails, when an information provider menu is selected by way of a remote control.

For example, the supplementary information provider unit 1145 can use the pre-stored thumbnails and position information to cluster the position information into regional units (e.g. counties, districts, etc.) and then generate and provide travel course information.

When providing the travel course information clustered into regional units, the supplementary information provider unit 1145 can also provide the thumbnail images together. Here, the travel course information can further include basic guide information (e.g. information on the course, information on historic landmarks, etc.) for each travel course.

Figure 12:
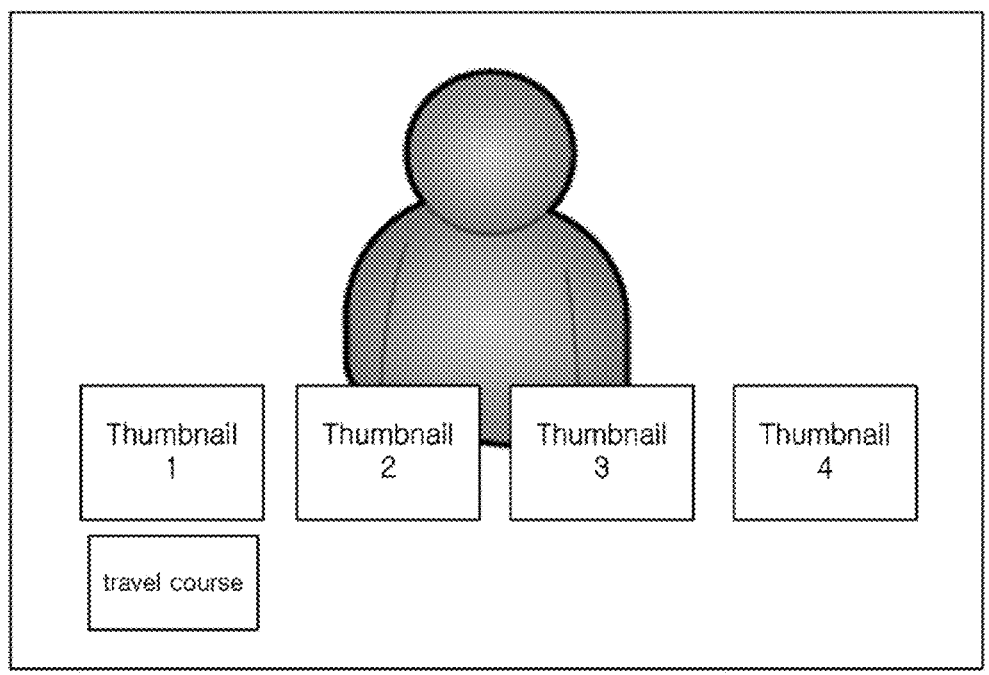
FIG. 12 illustrates a method of providing supplementary information by using a content according to another embodiment of the invention.
Figure 13:
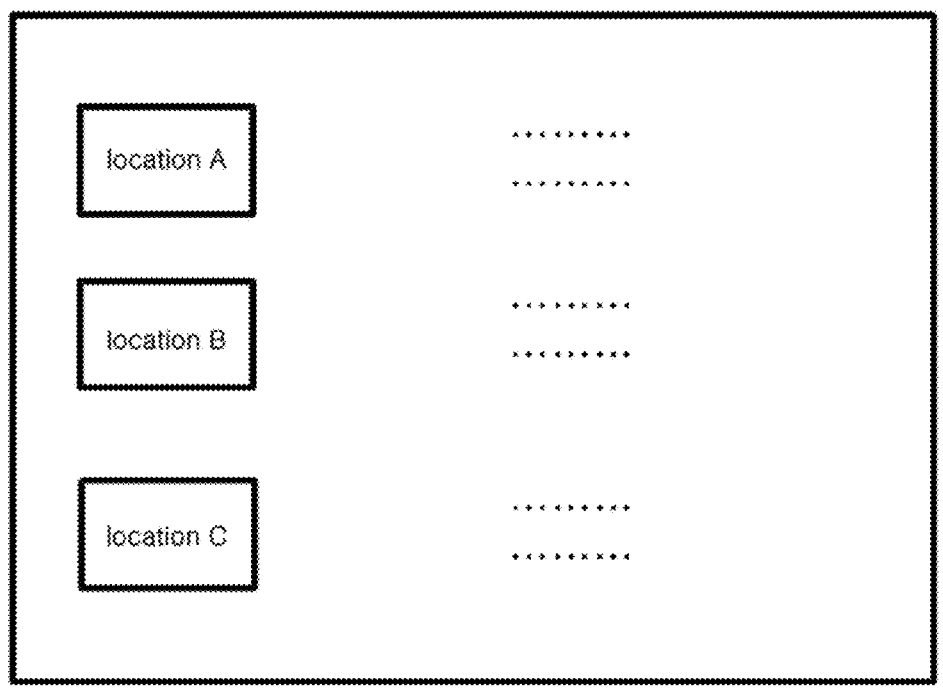
FIG. 13 illustrates a screen showing supplementary information according to another embodiment of the invention.

FIG. 12 illustrates a method of providing supplementary information by using a content according to another embodiment of the invention, and FIG. 13 illustrates a screen showing supplementary information according to another embodiment of the invention.

As illustrated in FIG. 12, the client device can play the content together with the thumbnail images. While in this state, the client device can separately display menu items that can be provided additionally in correspondence to the content in an area of the content play screen, as illustrated in FIG. 12. In the example illustrated in FIG. 12, it is assumed that the supplementary information corresponding to the content is travel information, and that a corresponding menu item is "travel course".

Suppose that a user selected has selected the "travel course" menu item using a remote control, while the content is being played together with the thumbnails. The client device can show the travel course information for the corresponding content through the client device. As already described above, the travel course information can include information on a particular location generated by using the thumbnail images created using the position information of each scene in the content and the position information.

For example, suppose the content is a broadcast program that introduces viewers to local sightseeing attractions. The broadcast program can be shot during travels to various locations, and therefore the position information can be different for the scenes shot for each location. The client device can have thumbnails and their respective position information stored beforehand based on the position information for each scene, and can thus use the these to easily generate travel course information for the corresponding locations as supplementary information and provide it to the user (see FIG. 12). The travel course information can include the position information and basic guide information for each scene (location) and can provide the thumbnail together as an image of the corresponding scene (location). Here, the travel course information can be provided such that the movement distances are optimized by using the position information for each scene of the content, or the travel course information can be provided in the order of appearance in the corresponding content.

In another embodiment, the client device can store the location names associated with the position information of the thumbnails as keywords corresponding to the thumbnails. Of course, the location names associated with the position information corresponding to the thumbnails can be stored as keywords by using metadata. The client device can store the location names, including the position information corresponding to the thumbnails, as keywords after receiving the names from a separate server (not shown) and store them as keywords, or after searching the location names by way of a built-in application.

When a particular location name is inputted as a search keyword and a search is requested by way of a remote control, the client device can search the metadata by using the corresponding search keyword to identify a matching keyword, and then extract and show the thumbnail images matching the keyword identified.

The methods for creating a content incorporating the position information, creating thumbnail images by using the position information, and providing the thumbnails together with the content, can be implemented in the form of program instructions that may be executed using various means for electronically processing information and can be recorded in a storage medium. Such a storage medium can include program instructions, data files, data structures, etc., alone or in combination.

The program instructions recorded on the medium can be designed and configured specifically for the present invention or can be a type of medium known to and used by the skilled person in the field of computer software. Examples of a storage medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a means for electronically processing information through the use of an interpreter, etc.

The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A client device having a processor that controls operation of the client device, the client device comprising:
   a receiver unit of the processor receiving an encoded content from a server;
   a decoder unit of the processor decoding the encoded content, the decoded content containing position information for each scene;
   an extractor unit of the processor extracting a first target scene in which position information is changed, from among sequential scenes of the decoded content being played on the client device;
   a thumbnail creator unit of the processor creating a thumbnail for the extracted scene; and
   an output unit of the processor outputting at least one of the thumbnail and the content,
   wherein the extractor unit compares the first target scene with scenes following the first target scene, respectively, and extracts a second target scene among the scenes following the first target scene, where a difference between position information of the second target scene and the position information of the first target scene is greater than a reference value.

2. The client device of claim 1, wherein the thumbnail creator unit stores a play position or a play time for the scene corresponding to the thumbnail.

3. The client device of claim 2, wherein the processor controls playing of the content such that when one of the outputted thumbnails is selected, the content is played from the play position or the play time corresponding to the selected thumbnail.

4. The client device of claim 3, wherein the processor controls an output of the thumbnails such that the thumbnails are arranged in intervals corresponding to the play time or play position.

5. The client device of claim 1, wherein, if the position information for each scene is repeated for a plurality of frames, the extractor unit extracts an earliest frame.

6. The client device of claim 1, wherein, if a difference between the position information for a scene and the position information for a previously extracted scene for a decoded content is below a reference value, the extractor unit does not extract the scene even though the position information is different.

7. A method of playing a content, the method comprising:
   receiving, by a processor, an encoded content from a server, the content containing position information for each scene;
   decoding, by the processor, the encoded content;
   extracting, by the processor, a first target scene in which position information is changed, from among sequential scenes of the decoded content being played on a client device;
   creating, by the processor, a thumbnail for the extracted scene;
   outputting, by the processor, at least one of the thumbnail and the content;
   comparing, by the processor, the first target scene with scenes following the first target scene, respectively; and
   extracting, by the processor, a second target scene among the scenes following the first target scene, where a difference between position information of the second target scene and the position information of the first target scene is greater than a reference value.

8. The method of claim 7, wherein the thumbnail is stored in correspondence to a play position or a play time, and the method further comprises:
   controlling, by the processor, the playing of the content such that, if one of the outputted thumbnails is selected, the content is played from the play position or the play time corresponding to the selected thumbnail.

9. A non-transitory recorded medium having recorded thereon and tangibly embodying a program of instructions for executing the method of playing a content according to claim 7 or claim 8.

10. A client device comprising:
a display unit;
a communication unit configured to receive an encoded content from a server;
a memory storing at least one application; and
a processor interworking with the memory and configured to execute the application stored in the memory,
wherein the executed application performs operation of:
  decoding the encoded content, the decoded content containing position information for each scene;
  extracting a first target scene in which position information is changed, from among sequential scenes of the decoded content being played on the client device;
  creating a thumbnail for the extracted scene;
  outputting at least one of the thumbnail and the content through the display unit;
  comparing the first target scene with scenes following the first target scene, respectively; and
  extracting a second target scene among the scenes following the first target scene, where a difference between position information of the second target scene and the position information of the first target scene is greater than a reference value.

* * * * *